US007656879B2

(12) United States Patent
Riedel et al.

(10) Patent No.: US 7,656,879 B2
(45) Date of Patent: Feb. 2, 2010

(54) BIDIRECTIONAL QOS RESERVATION WITHIN AN IN-BAND SIGNALING MECHANISM

(75) Inventors: Matthias Riedel, Stuttgart (DE); Jochen Eisl, Garching (DE)

(73) Assignees: Sony Deutschland GmbH, Berlin (DE); Nokia Siemens Networks GmbH & Co. KG, Munich (DE)

( * ) Notice: Subject to any disclaimer, the term of this patent is extended or adjusted under 35 U.S.C. 154(b) by 308 days.

(21) Appl. No.: 10/573,884

(22) PCT Filed: Aug. 13, 2004

(86) PCT No.: PCT/EP2004/009114

§ 371 (c)(1),
(2), (4) Date: Mar. 6, 2007

(87) PCT Pub. No.: WO2005/041495

PCT Pub. Date: May 6, 2005

(65) Prior Publication Data

US 2007/0217406 A1      Sep. 20, 2007

(30) Foreign Application Priority Data

Sep. 30, 2003  (EP)  .................................. 03022150

(51) Int. Cl.
*H04L 12/28* (2006.01)
(52) U.S. Cl. .................. 370/395.21; 709/226; 709/227; 709/228; 709/238
(58) Field of Classification Search ................. 370/231, 370/349, 390, 395.21; 709/226, 227, 238
See application file for complete search history.

(56) References Cited

U.S. PATENT DOCUMENTS

| 5,802,106 | A  | * | 9/1998 | Packer ........................ 375/225 |
| 6,574,335 | B1 | * | 6/2003 | Kalmanek et al. ........... 379/386 |
| 7,002,961 | B1 | * | 2/2006 | Lane et al. ............... 370/395.1 |
| 7,151,772 | B1 | * | 12/2006 | Kalmanek et al. ........... 370/390 |
| 7,400,582 | B2 | * | 7/2008 | Shaheen et al. ............. 370/231 |
| 2001/0027490 | A1 | * | 10/2001 | Fodor et al. ................. 709/238 |
| 2001/0054103 | A1 | * | 12/2001 | Chen ......................... 709/226 |
| 2002/0054405 | A1 | * | 5/2002 | Guo et al. ................... 359/118 |
| 2003/0161322 | A1 |   | 8/2003 | Shaheen et al. |

(Continued)

OTHER PUBLICATIONS

Braden, Ed. R. et al., "Resource ReSerVation Protocol (RSVP)—Version 1 Functional Specification", Network Working Group, pp. 1-31, S1997.

(Continued)

*Primary Examiner*—William Trost, IV
*Assistant Examiner*—Emmanuel Maglo
(74) *Attorney, Agent, or Firm*—Oblon, Spivak, McClelland, Maier & Neustadt, L.L.P.

(57) ABSTRACT

A mechanism for a bidirectional reservation procedure within an in-band signaling mechanism gives symmetric real-time services running on mobile devices, which are used to support different access technologies in dynamic, mobile, wireless IP networks where the quality of the node connectivity can sometimes be unpredictably time-varying, the possibility to mutually reserve, monitor and adapt resources and service parameters for upstream and downstream direction along a communication path. The mechanism optimizes reservation mechanisms, especially for adaptive real-time services in wireless and wireless ad-hoc networks, by making use of a dynamic bidirectional reservation in-band signaling approach.

19 Claims, 4 Drawing Sheets

U.S. PATENT DOCUMENTS

2004/0024901 A1* 2/2004 Agrawal et al. ............. 709/238
2004/0170156 A1* 9/2004 O'Neill ...................... 370/349

OTHER PUBLICATIONS

Talukdar, Anup Kumar et al., "MRSVP: A Reservation Protocol for an Integrated Services Network with Mobile Hosts", Wireless Networks, vol. 7, No. 1, pp. 5-19, 2001.
Lee, Seoung-Bum et al., "INSIGNIA: An IP-Based Quality of Service Framework for Mobile ad Hoc Networks", Journal of Parallel and Distributed Computing, vol. 60, No. 4, pp. 374-406, 2000.
Chiruvolu, Girish et al., "Mobility and QoS support for IP v6-based Real-time Wireless Internet Traffic", IEEE, vol. 1, No. 6 pp. 334-338, 1999.
S. Shenker, et al., "Network Element Service Specification Template", Xerox PARC/MIT LCS, RFC 2216, Sep. 1997, pp. 1-20.
S. Blake, et al.; An Architecture for Differentiated Services, Torrent Networking Technologies, RFC 2475, Dec. 1998, pp. 1-32.
R. Braden, et al., "Integrated Services in the Internet Architecture: an Overview", ISI, RFC 1633, Jun. 1994, pp. 1-29.
S. Deering, et al., "Internet Protocol, Version 6 (IPv6) Specification", Cisco, RFC 2460, Dec. 1998, pp. 1-35.

* cited by examiner

BIDIRECTIONAL QOS RESERVATION WITHIN AN IN-BAND SIGNALING MECHANISM

FIELD AND BACKGROUND OF THE INVENTION

The present invention relates to the field of quality-of-service (QoS) support for applications such as adaptive real-time services running on mobile devices, which are used to support different access technologies in dynamic, mobile, wireless IP networks where the quality of the node connectivity can be unpredictably time-varying.

A source of temporary network resource degradation is the bandwidth-constrained wireless link level performance. Due to radio link characteristics and impairments, connections between mobile nodes can be time-varying. Unpredictable time-varying link quality has negative effects on the connectivity between adjacent nodes and terminal access to the network as well.

A further source of unreliability lies in a potentially unpredictable availability or movement behavior of wireless nodes, which belong to an intermediary transport network, e.g. a third-party network. Mobile networks beyond 3G may extend fixed wireless network access infrastructure with wireless ad-hoc networks to extend radio coverage and network capacity for mobile users. An architecture comprising wireless access routers or even mobile terminals has been investigated by the European project MIND (see IST-2000-28584 MIND, Mobile IP-based Network Developments, http://www.ist-mind.org/). The removal or switch off of wireless network nodes such as wireless routers or mobile terminals could leave behind a separated network branch that has been cut off from public access. As a consequence, transport quality along a dedicated path through a network might change over time quite frequently and significantly.

Hence, existing QoS-sensitive flows have to be rapidly established, restored, adapted and released in response to wireless impairments as well as topology changes. As described in the article "A Framework for Bidirectional QoS Signaling" (Internet Draft, 2002) by S. M. Shahrier and K. M. Shaheen, this problem counteracts the principle to support real-time conversational applications, e.g. voice-over-IP (VoIP) or videoconferencing, with performance requirements similar to those of existing circuit-switched or voice-based wired and wireless systems because all these symmetric streaming services impose stable symmetric bidirectional resource requirements, e.g. bandwidth and latency characteristics.

The complexities of existing protocols often do not meet these requirements. Service architectures have been proposed to enable resource reservation for an individual data flow (e.g. file exchange with an ftp server), namely the Integrated Services (IntServ) model. Alternatively, the Differentiated Service (DiffServ) model has been proposed to improve scalability by determining packet forwarding behavior on aggregates of flows with less state information required in network nodes along the routing path. The resource reservation protocol (RSVP) as one candidate of the IntServ model has been proposed to enable an application to spontaneously signal resource demands to a peer host. The protocol may be interpreted hop-by-hop along the routing path or tunneled transparently to a non-RSVP network region with appropriate mapping mechanisms in place at the network boundaries of the non-compliant region. Though the RSVP protocol has gained some acceptance in IP-related research and standardization communities, deficiencies of the protocol become obvious when it has to interoperate with adaptive real-time applications in mobile environments. Even ongoing standardization to extend RSVP (as investigated in IETF WG NSIS) can not sufficiently compensate the described networking problems since a clear separation between control and user data does not allow fast adaptation to changed networking conditions.

At the local level, ad-hoc networks that link notebook or palmtop computers could be used to spread and share information among participants of a conference. They might also be appropriate for applications in home networks where devices can communicate directly to exchange information, such as audio and/or video signals, alarms, and configuration updates. Perhaps the most far-reaching applications in this context are more or less autonomous networks of inter-connected home robots that clean, do dishes, mow the lawn, perform security surveillance, and so on. Recently, ad-hoc multi-hop networks were proposed for environmental monitoring, in which said networks could be used to forecast water pollution or provide early warnings of an approaching tsunami. Short-range ad-hoc networks can simplify intercommunication between various mobile devices (e.g. cellular phones and PDAs) by forming a so-called "Personal Area Network" (PAN), thereby eliminating the need for cables. This could also extend the mobility provided by fixed networks to nodes of an ad-hoc network domain.

Typically, mobile ad-hoc networks (MANETs) operate with distributed functions and allow traffic to pass over multiple radio hops between a source and a destination. Routing algorithms and the implications of radio layers are challenging research areas for these networks. The inherent unpredictability in a network whose nodes move poses a challenge to routing and mobility functions if data is consistently transferred between the nodes of the underlying network. Nonetheless, multi-hop radio systems also make it possible to save battery capacity while retaining performance. In any case, the most attractive property of an ad-hoc networking model is perhaps its independence from centralized control and, thus, the increased freedom and flexibility it gives the user.

BRIEF DESCRIPTION OF THE PRESENT STATE OF THE ART

In order to understand the central idea of the invention, it is necessary to briefly explain some of the most important QoS reservation concepts and protocols according to the state of the art.

As described in the article "Network Element Service Specification Template" (IETF RFC 2216, September 1997) by S. Shenker and J. Wroclawski, various QoS reservation concepts are offered to mobile users today. The term "quality of service" (QoS) refers to the nature of the provided packet delivery service, which is described by parameters such as the currently achieved bandwidth, packet delay, packet loss rates, etc. Traditionally, the Internet offers a single-QoS, best-effort delivery, in which the available bandwidth and delay characteristics depend on the instantaneous load. The control over QoS seen by applications is exercised by an adequate provisioning of the underlying network infrastructure.

For QoS-enabled IP-based networks, there are two main service streams, namely Integrated Services (IntServ) with its accompanying signaling (Resource) Reservation Setup Protocol (RSVP) and differentiated services (DiffServ) as described in the article "An Architecture for Differentiated Services" (IETF RFC 2475, December 1998) by S. Blake, D. Black, M. Carlson, E. Davies, Z. Wang, and W. Weiss. The IntServ architecture mentioned above defines a set of extensions to the traditional best-effort (BE) model of the Internet with the object to provide applications with end-to-end QoS. Said differentiated services provide an aggregation of reservations for similar QoS data flows without any signaling. Therefore, DiffServ networks classify packets into one out of a small number of aggregated QoS data flows or "classes", based on the so-called DiffServ Code Point (DSCP).

For a QoS architecture a packet classifier is used to classify packets into a flow or sequence of packets that should be treated in a specified way, e.g. as proposed by the IntServ architecture, which is described in the article "Integrated Services in the Internet Architecture: An Over-view" (IETF RFC 1633, June 1994) by R. Braden et al. For this purpose, a reservation identifier is required to uniquely identify an application flow. A reservation identifier can comprise several packet fields, e.g. IP source, destination IP address, port numbers etc. For IPv6, as described in the "Internet Protocol, Version 6 (IPv6) Specification" (IETF RFC 2460, December 1998) by S. Deering and R. Hinden, a flow label field has been defined to simplify classification of individual flows. There have been proposals to evaluate this field together with the IPv6 sender source address for unique identification of a flow.

As described in the articles "Resource ReSerVation Protocol (RSVP)—Version 1: Functional Specification" (IETF RFC 2205, September 1997) by R. Bradon et al., the concept of "soft state" is used by the resource reservation protocol (RSVP), which uses periodic refresh message sent along the data path to maintain the connection alive. Thereby RSVP is an end-to-end control protocol, which forms the signaling part of the integrated services architecture. The reservation is receiver-oriented, and the aggregation of said reservations is supported depending on the needs of the respective application. A QoS data flow may have multiple senders, and the protocol supports different reservation styles to dictate how to aggregate reservations for different senders. Two important message types used by RSVP are "PATH" and "RESV". Each data source periodically sends a "PATH" message that sets up the path state at the routers along the path from the sender to the receiver. The receiver of each QoS data flow periodically sends a "RESV" message, which sets up a reservation state at intermediate routers along the reverse path from the receiver to the sender. Thereby, RSVP assumes a fairly stable path across the network.

The Mobile Resource Reservation Protocol (MRSVP) as described in the article "MRSVP: A Resource Reservation Protocol for an Integrated Services Network with Mobile Hosts" (Department of Computer Science, Technical Report, DCS-TR-337, Rutgers University, USA, July 1997) by A. K. Talukdar, B. R. Badrinath and A. Acharya supports two types of reservations: active and passive reservations: An active reservation corresponds to a QoS data flow over which data is actually exchanged, whereas a passive reservation books resources in advance still to be used by other data flows that might require weaker QoS guarantees or best-effort services.

SHORTCOMINGS AND PROBLEMS OF THE PRIOR-ART SOLUTIONS

One of the most significant problems within an ad-hoc network is that the routing path of a data flow and the QoS conditions of a communication connection might change over time quite frequently and significantly. Therefore, the data flow possibly has to be rapidly redirected, restored, adapted and released in response to wireless environment impairments and topology changes. Nowadays, the prevailing QoS protocols according to the state of the art are not well suited to such a dynamic mobile wireless environment. Instead of proactively probing the QoS situation of the potential future routing path, they react in a more passive and reactive way to the QoS condition changes caused by handover processes.

Typically, conventional resource reservation protocols such as RSVP only support unidirectional reservation requests. A solution, which has been discussed so far for symmetric applications is the unbundled bidirectional reservation. Thereby, two unidirectional connections are established from opposite communication endpoints ("application peers") For routing nodes along the path both reservations have no inter-dependence since the upstream flow has no relationship to its associated downstream traffic in the sense of routing restrictions. These unpredictable asymmetries could e.g. lead to the situation that the overall QoS needs for a conversational connection are not longer sufficient although one direction of the connection would have still sufficient capabilities. In mobile wireless networks where the link quality may frequently vary over time there is a requirement for specific types of bidirectional applications to "bundle" the routes in each direction. Thereby, both directions should follow the same route or should be treated as a single instance by the network.

Whilst transport- and network-layer QoS have been studied within the Internet for many years, these works are mainly based on the assumption of a wired network. Wireless communication within a multi-homed heterogeneous access network where mobile nodes have to deal with wireless link connections, however, is characterized by restricted bandwidths, increased error rates and resource fluctuations. In addition, when mobile nodes change their point of access to the network, mechanisms are needed to control the behavior of the system during and after a handover. Hence, wireless QoS provisioning becomes more relevant to deal with this inherent behavior of these unreliable networks. Taking conversational real-time applications into account which run on the mobile node, such as voice-over-IP (VoIP) or videoconferencing, the requested QoS capabilities are similar to those of existing circuit-switched or voice-based wireless systems as described in the article "A Framework for Bidirectional QoS Signaling" (Internet Draft, 2002) by S. M. Shahrier and K. M. Shaheen.

These symmetric streaming services demand stable symmetric bidirectional bandwidth and latency conditions. The need of bidirectional reservations is also evident within TCP connections where the throughput is reduced if acknowledgment messages are delayed or lost on the backward path.

Figure 1:
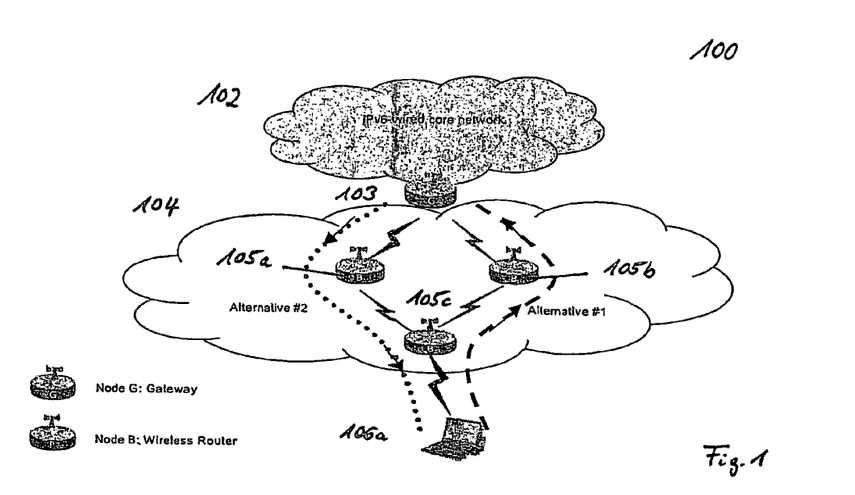
FIG. 1 shows an overview of a wireless bidirectional communication scenario, wherein different paths are reserved for the up- and downlink connection, which gives an example where an application flow, generated in a mobile node, can be routed between two alternative ways to get connected to an access network.

FIG. 1 gives an example where an application flow, generated in the mobile node, can be routed between two alternative ways to get connected to the access network. In contemporary IP transport networks there is no restriction on the down-stream and the upstream flow to follow different paths on the physical network. Thus, QoS reservations are not bidirectional due to asymmetric IP routing for both directions. This situation can cause problems in mobile wireless streaming real-time scenarios where the application relies on symmetric capabilities along the communication path.

In contrast to the wired world, these capabilities are unpredictable over the time in the mobile wireless case. This can lead to the situation where the uplink is not longer able to support the requested QoS parameters and, on the other hand, the downlink has not been affected by any wireless link quality changes. These asymmetries could imply that the overall QoS needs for bidirectional connections are not longer sufficient although the path of one direction would still have sufficient resources.

OBJECT OF THE PRESENT INVENTION

In view of the explanations mentioned above, it is the object of the invention to propose an effective QoS mechanism in ad-hoc network environments.

This object is achieved by means of the features of the independent claims. Advantageous features are defined in the dependent claims. Further objects and advantages of the invention are apparent in the detailed description, which follows.

SUMMARY OF THE INVENTION

Figure 2:
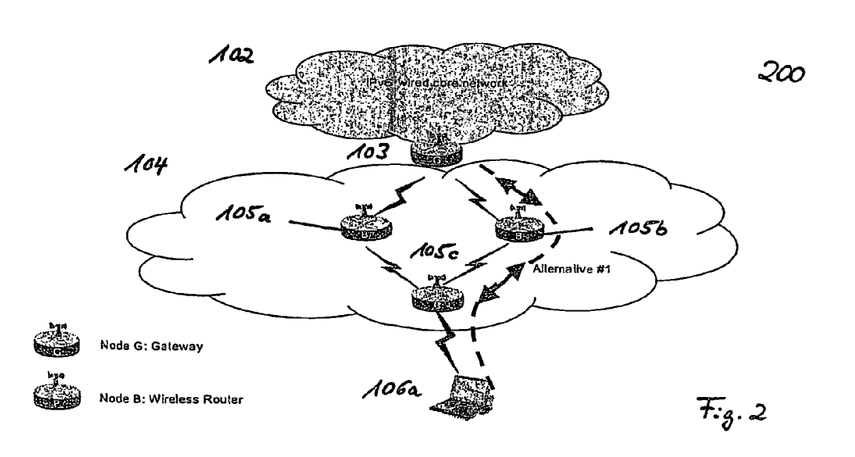
FIG. 2 shows an overview of a wireless bidirectional communication scenario, wherein the same paths are reserved for the up- and downlink connection.

The proposed solution of the present invention is dedicated to a mechanism for a bidirectional QoS reservation procedure within an in-band signaling mechanism that gives symmetric real-time services running on mobile devices, which are used to support different access technologies in dynamic, mobile, wireless IP networks where the quality of the node connectivity can sometimes be unpredictably time-varying, the possibility to mutually reserve, monitor and/or adapt QoS resources and service parameters for up- and downstream direction along a communication path. The proposed solution thereby optimizes conventional QoS reservation mechanisms according to the state of the art, especially for adaptive real-time services in wireless networks and wireless ad-hoc networks by making use of a dynamic bidirectional QoS reservation in-band signaling approach based on dynamic bidirectional bundled network resource reservations. The technical term "in-band" thereby refers to a situation where separation between control data and user plane data is abandoned. Thereby, both communication directions may not be independent from the perspective of the network. FIG. 2 shows a communication scenario example where up- and downlink are forced to use the same communication path.

In the following section, a number of prerequisites for the proposed solution according to the invention with respect to QoS monitoring, reservation management and the applied soft state model shall briefly be described.

QoS monitoring: The QoS framework should be able to monitor the actual QoS capabilities on the data link layer (layer 2). It shall be assumed that an adaptive application is regularly supplied with up-to-date information about network resource availability along the QoS-enabled path. Therefore, an in-band signaling mechanism is proposed that provides optimal support for adaptive applications.

Reservation management: The data link layer must be able to process QoS requests generated by the QoS model, e.g. passive or active resource reservation requests.

Soft state model: In wireless networks, the reservation initiator which is used to keep the reserved connection alive should be able to periodically refresh network state information, which is described by a soft state reservation model.

In general, a reservation may be unidirectional or bidirectional. The initiator of a reservation request thus provides resource reservation information by means of "QoS information elements", which are embedded in a "QoS container".

The proposed in-band signaling approach is correlated with a flexible resource reservation mechanism, which provides reservation features for a wide range of applications. This concept enables a client or server application to specify its reservation style requirements such that these fit best to a given service or business model. The resource parameters are specified in the "QoS information elements" included in the "QoS container".

A possible implementation is to integrate the "QoS container" into the IPv6 hop-by-hop extension header, which is described in the article "Internet Protocol, Version 6 (IPv6) Specification" (IETF RFC 2460, December 1998) by S. Deering and R. Hinden. The reservation "QoS container" is composed in modular fashion. For example, an application can include those parameters that are necessary from a set of predefined values.

The specification of "QoS information elements" offered to an application has major impacts on the resource usage of the network. More precisely, these information elements influence the timing of reservation, the control over it and other issues.

In order to provide efficient usage of resources among multiple flows, it is recommended to establish network policies, which define the permissible circumstances for applying specific "QoS information elements". Reservation adaptivity, i.e. the ability to adapt to changed conditions in the network, is not a reservation style parameter to be indicated to the IP layer. It is assumed that adaptivity is agreed on between flow terminating nodes, which take into account the currently available resources offered by the IP and lower layers.

A concept is introduced to allow fast reservation, which happens on one pass without confirmation. Alternatively, reservation may be triggered by the acknowledgment traveling towards the initiator of the request. Therefore, the concept of active and passive reservation is introduced. It has been derived from MRSVP, which supports these two types of reservations.

For a passive reservation a flow can declare its demand of network resources e.g. a certain amount of bandwidth for potential future use. These "passive reserved" resources can be used by any other flows until the status of the reservation is changed to active reservation. Therefore, passively reserved resources can be borrowed by other flows. In this way, network utilization in networks with alternating conditions can be improved. Passive state reservation may be used in advance to a planned handover as well.

An active reservation is exclusively assigned to a specific flow or flow aggregate with well-defined QoS capabilities for data packet exchange. No other flow can share allocated resources except the one who made the active reservation. The active reservation is also defined as soft state and has therefore to be refreshed.

A unidirectional reservation can be considered as a fallback solution in case a bidirectional reservation cannot be established or has to be released. In this case, datagrams between two communication peers do not necessarily travel along the same path due to asymmetric links or load distribution.

Compared to RSVP, where only unidirectional reservation requests are supported, in this approach the possibility to request for a bidirectional reservation is introduced. For a bidirectional reservation it is assumed that upstream and downstream reservation between two-peer hosts use the same path through the network in opposite direction. A bidirectional data flow represents an atomic instance that combines resource reservations in opposite directions along the same path. The bidirectional path may be established hop-by-hop or by means determining an explicit route list. To support symmetric and asymmetric reservations, a separate set of reservation metrics and monitoring fields for the forward and reverse direction has to be considered for a protocol implementation.

To establish a reservation, an independent probing mechanism has to test both uplink and downlink network paths. Each hop has to check for available resources for outgoing and incoming interface and possibly reserve (passive or active) resources for both interfaces before forwarding the request to the next hop router from the initiator perspective.

The feedback about the result of the bidirectional reservation establishment process can be stored within the "actual value" field. The application, while receiving the monitoring information of the reservation setup, is in charge of deciding how to react to the reservation result.

Today's state of the art routing nodes do not support a reservation for both directions in a single step. In case a routing node does not support bidirectional reservation setup, the result of a partially failed reservation will be stored within the according monitoring field (e.g. in case of the QoS metric within the "actual value" field). Within this process the initiator will be notified that only one direction of the reservation request could be established and therefore a bidirectional reservation request could not be fulfilled.

Asymmetric network load may also cause the failure of a bidirectional reservation setup. In case of failure the initiator has the responsibility to decide how to deal with the situation of insufficient resources. One reaction scheme could be that the initiator requests only a unidirectional reservation. By receiving only a unidirectional reservation, the peer has the responsibility to establish the downstream reservation by itself.

Figure 3:
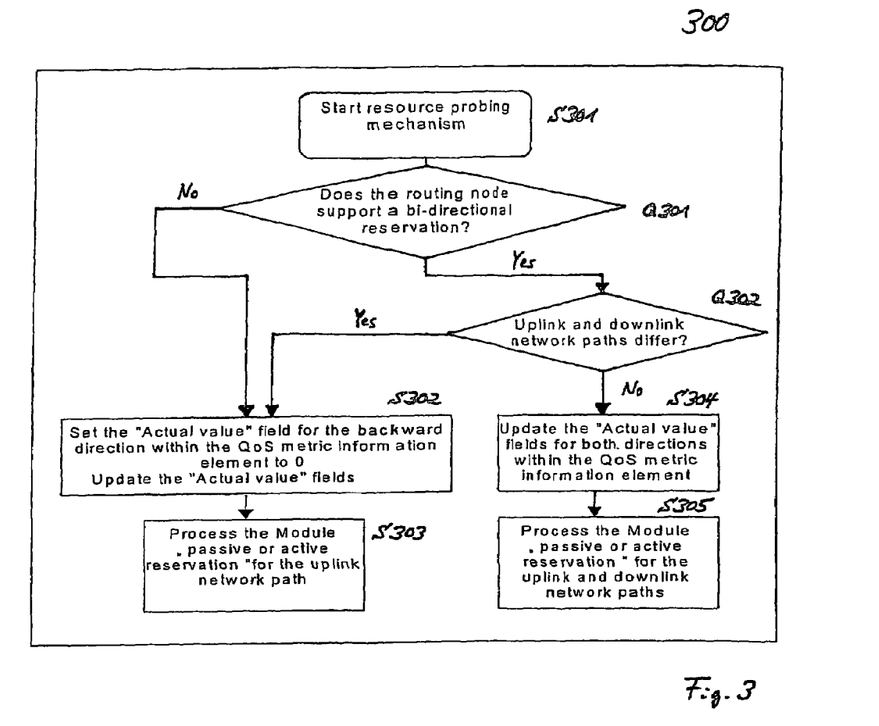
FIG. 3 is a flow chart which shows the bidirectional reservation setup procedure according to one embodiment of the present invention.
Figure 4:
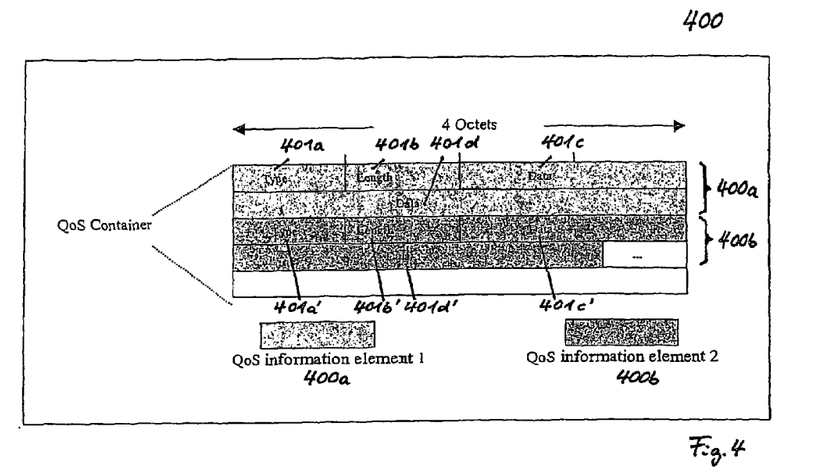
FIG. 4 illustrates an example for the structure of the QoS container of an IP datagram.

In case the resource probing mechanism detects that upstream and downstream paths for a bidirectional reservation do not follow identical routes at a specific routing node along the reservation path, some or all monitored attribute values carried in the IP datagram header are set to zero at the respective node. Dependent on the syntax specification of the reservation protocol those attribute values should be set to zero that enable the reservation endpoints to easily interpret the situation of routing asymmetry. FIG. 3 shows the decision path for a bidirectional reservation setup.

When a bidirectional reservation is timed out or explicitly removed, both upstream and downstream reservations entries are removed.

The advantages of the present invention consist in the performance of a dynamic bidirectional resource reservation, which can be achieved in a single step, a combined reservation monitoring and adaptation of two directions and an inband signaling concept which can suitably be applied to mobile environments.

Dynamic bidirectional resource reservation: Particular applications, which presume a bidirectional communication path could benefit from bidirectional reservations. Both communication directions may not be independent from the perspective of the application. In wireless networks where the link quality may frequently vary over time there is a requirement for specific types of applications to "bundle" the routes in opposite direction, which means that both directions should follow the same route or should be treated as a single instance by the network.

Bidirectional resource reservation in one step: Resources may be allocated by a single message transmitted hop-by-hop between the initiator of a request and its corresponding node or alternatively by two messages (request and confirmation). For a bundled bidirectional reservation it is assumed that upstream and downstream reservation between two-peer hosts use the same path through the network in opposite direction. The invention thereby introduces the concept of a bidirectional flow as an atomic instance, which combines reservations in opposite directions along the same path. Bidirectional reservation bundling ensures signaling advantages by reducing the network-signaling overhead.

Combined reservation monitoring and adaptation of two directions: Independent probing mechanisms are needed to test both uplink and downlink network paths. Each hop has to check for available resources for outgoing and incoming interface and possibly reserve the resources for both interfaces before forwarding the request to the next hop router from the initiator perspective. Bidirectional monitoring or adaptation of resources is carried out within a single message. In case of handover situations and QoS adaptation, flow bundling may speed up the renegotiation process.

In-band signaling concept for mobile environments: In-band signaling is most beneficial for the bidirectional bundled reservation over network links with unpredictable characteristics. The signaling overhead is considerably small for a regular bidirectional flow. For example, said signaling information can be piggybacked by application datagrams if these are sent regularly within the configured soft state time interval. The host, which represents the reservation end point, generates feedback information of the reservation. As there is no application data transmitted to the reservation initiator, provisioning of this feedback information induces some problems for a unidirectional application flow. For a reliable transport connection (e.g. TCP) there is still a bidirectional message flow, which can be used to carry feedback information to the initiator of the reservation. If there is no bidirectional flow, said feedback information may be placed in an IPv6 datagram with no other purpose. However, it has to be considered that this procedure imposes additional signaling load to the network.

One embodiment of the invention pertains to a bidirectional quality-of-service (QoS) reservation method for reserving, allocating, monitoring and/or adapting network resources and/or service parameters needed for symmetric real-time multimedia applications and/or data services running on a mobile node and a correspondent node by signaling resource control information in both directions along specific routing paths between these nodes through an IP-based dynamic mobile ad-hoc network which comprises a number of interconnected forwarding nodes whose connectivity is unpredictably time-varying. Resource control information to be transmitted between the mobile node and the correspondent node is embedded in an IP datagram which is sent hop-by-hop via the routing path of the reserved connection for these nodes, and resource control information is disseminated between the mobile node and the correspondent node by using the same routing path through the network hop-by-hop in both directions.

Thereby, either the mobile node or the correspondent node initiates a resource reservation request message indicating the demand for a predefined amount of network resources simultaneously for both directions. The initiator of the reservation request and the initially proposed amount of network resources for the reservation are defined by an agreement or contract which has been established between the communicating peers. Alternatively, both parties arrange an agreement by means of a session- or application-layer negotiation.

According to the invention, the initiator of the resource reservation request message generates a unique reservation identifier (ID) associating the bidirectional connection with a single application flow or an aggregated flow for IP datagram classification in both directions to achieve a specific forwarding behaviour which remains unchanged during the life-time of the associated flow. Thereby, network resources are allocated or monitored hop-by-hop by using resource control information piggy-packed in an IP datagram, or both is done at the same time for both directions of the resource reservation request message, wherein resource control information for both directions of the reserved routing path is embedded in the same IP datagram.

Resource control information for each direction of a reservation is piggybacked via resource information elements that are a part of the header extension of the IP datagram, wherein each resource information element represents either a resource attribute along the reserved routing path, associated with a quantifiable resource metric for either one or both directions of the flow, or a flow attribute for an individual flow or flow aggregate, associated with quantifiable and non-quantifiable flow context information either for one or both directions of the flow.

Thereby, said resource information elements describe resource control information for upstream direction from the initiator towards the receiver or downstream direction from the receiver towards the initiator of a resource reservation request message or for both directions together, wherein upstream and downstream direction are uniquely identified by the mobile node and the correspondent node due to their role in the reservation procedure either as initiator or receiver of a resource reservation request message.

The resource information elements are organized in a modular fashion for each flow, which means that the node that originates the resource control information determines the number of resource information elements to be placed into an IP datagram header.

Each resource information element comprises a field for the monitored attribute value and attribute requirement specification fields specifying resource-attribute-specific flow requirements, which are described by an upper threshold defining the maximum value and/or a lower threshold defining the minimum value for the respective resource attribute. Alternatively or in addition, discrete values for the respective resource attribute can be specified. The attribute requirement specification can be generated and modified either by the initiator or the receiver of the reservation and can be interpreted by routing nodes along the reservation path to allocate the requested amount of resources.

According to a further embodiment of the present invention, information about available resources for both directions of the reservation along the reserved routing path between the mobile node and the correspondent node are simultaneously monitored. For every node along the reserved routing path, actual resource attribute values for up- and downstream direction are determined. If at any node along the reserved routing path a monitored resource attribute either for up- or downstream direction or for both directions has a value which is less than the correspondent monitored attribute value that is carried in the IP datagram header, the new value is assigned to the resource information element of the IP datagram header, which enables the receiver of the resource control information to determine current resource values for both directions.

According to a still further embodiment of the present invention, a resource reservation request message describing a set of attribute requirement specifications is sent from the initiator to the receiver, and the resource allocation procedure either for one or both directions of the resource reservation is controlled by either the mobile node or the correspondent node. Based on such a resource reservation request message, resource attribute values that should be allocated for the upstream direction, the downstream direction or both directions at the same time are determined by every forwarding node along the reserved routing path. Control of resources for the bidirectional reservation is handled by the communicating peers through higher layer negotiation. In case of lack of higher-layer negotiation mechanisms, the communicating peers can exchange information elements in specific IP extension headers that are interpreted end-to-end instead of hop-by-hop.

Resource control information for different bidirectional flows is piggy-packed in the same IP datagram, wherein for each flow a reservation identifier information element referring to additional flow and resource information elements in the header of the IP datagram is attached to the IP datagram header and the grouping of reservation identifiers and other resource information elements determines the membership of this information to a specific flow. Thereby, either the mobile node or the correspondent node determines on the IP layer whether bidirectional or unidirectional resource control information can be inserted into an IP datagram that is ready to be transmitted to the networking interface or whether a separate IP datagram needs to be generated for that purpose. Said resource control information is placed in any IP datagram which follows the reserved routing path between the initiator and the receiver of a resource reservation request message.

According to a further embodiment of the invention, conditions of insufficient resources along the routing path for upstream and downstream direction at the correspondent node are recognized by comparing monitored attribute values with the attribute requirement specifications in the resource information elements of an arriving IP datagram. The method thereby avoids defining specific exception or alerting messages. The addressed end system has to react to the lack of the specific resource.

Monitored resource attribute values of specific resource information elements specified in the IP datagram header are set to zero in case one or more forwarding nodes do not support these resource attributes.

One embodiment of the invention pertains to a bidirectional quality-of-service (QoS) reservation method which is characterized by the step of setting monitored attribute values carried in the IP datagram header at the respective node to zero that enable reservation end points to easily interpret the situation of routing asymmetry if up- and downstream path for a bidirectional reservation do not follow identical routes at a specific routing node along the reserved routing path.

According to a further embodiment of the invention, resource reservation request messages with the value zero for one or more attribute requirement specifications are interpreted as explicit release messages by the forwarding nodes along the reserved routing path and by the initiator or receiver of the resource reservation request messages. The values of these attribute requirement specifications are then associated with the removal of flow-specific reservation state information in the forwarding nodes along the reserved routing path.

Resource reservation request messages with a value unequal to zero for one or more attribute requirement specifications are interpreted as explicit setup messages by the forwarding nodes along the reserved routing path and by the receiver of the resource reservation request messages. The values of these attribute requirement specifications are then associated with the installation of flow-specific reservation state information in the forwarding nodes along the reserved routing path.

According to a still further embodiment of the invention, a flow information element specifying the type of reservation as either bidirectional or unidirectional is piggy-packed in the IP datagram header of a reservation setup message. This flow information element is then interpreted at the forwarding nodes along the reserved routing path to ensure correct installation of reservation state information.

BRIEF DESCRIPTION OF THE DRAWINGS

Further advantages and embodiments of the present invention result from the subordinate claims as well as from the following detailed description of the invention as depicted in the accompanying drawings:

DETAILED DESCRIPTION OF THE PRESENT INVENTION

In the following, embodiments of the present invention as depicted in FIGS. 1 to 9 shall be explained in detail. Furthermore, a brief survey of an exemplary message syntax for an in-band signaling protocol for bidirectional signaling according to the present invention shall be given. The meaning of the symbols, which are designated with reference numerals and signs in these figures can be taken from Table 2.

In IPv6, optional Internet-layer information is encoded in separate headers, which may be placed between the IPv6 header and the upper-layer header in a packet. Signaling information is carried in the hop-by-hop options header if it has to be interpreted by all routing nodes along a routing path. For information, which just has to be transferred between peer nodes, the destination option header is used.

According to an example of the present invention, the IPv6 hop-by-hop extension header, which is defined in the article "Internet Protocol, Version 6 (IPv6) Specification" (IETF RFC 2460, December 1998) by S. Deering and R. Hinden, is used to transport resource control information to be interpreted by routing nodes along the path. The signaling information is piggy-packed on an IP datagram, which follows the data path of the reserved connection hop-by-hop. Thereby, the same communication path through the network is used hop-by-hop in both directions in order to disseminate signaling information between both communication peers.

To provide a modular concept, the term "QoS container" is introduced. In general, a QoS container includes signaling information in form of QoS information elements, which are usually related to a single flow, but may be associated with a group of flows as well. A key concept of the approach is the variable number and size of QoS information elements that are located within a packet. For example, only information that currently needs to be interpreted is carried in the container. There are mandatory QoS information elements and optional QoS information elements within a QoS container, wherein optional QoS information elements contain supplementary information.

One QoS information element representation is the QoS metric information element, which carries QoS metric information. A QoS metric information element consists of a field for the monitored attribute value and further fields that specify resource-attribute-specific flow requirements, i.e. the attribute requirement specification. An upper threshold defining the maximum value or a lower threshold defining the minimum value for the respective resource attribute describes the attribute requirement specification. Alternatively, upper and lower threshold values can be specified together, which describe an interval within which values for the respective resource attribute are acceptable for the reservation. Alternatively or in addition, discrete values for the respective resource attribute can be specified. The attribute requirement specification can be generated and modified either by the initiator or the receiver of the reservation and can be interpreted by routing nodes along the reservation path to allocate the requested amount of resources.

Each reservation-initiating node has to generate a unique reservation identifier. The bidirectional connection is associated with a single application flow or an aggregated flow. The reservation identifier keeps unchanged during the lifetime of its associated flow and is used for IP datagram classification in both directions to achieve a specific forwarding behaviour.

Another example shows the need for the independence of the flow identifier. When the receiver of a flow changes its role and starts replying to a session defined by a specific reservation identifier, the receiver can add its IPv6 address in the IPv6 packet header source address field. In this case, the combination out of source address and the flow label will not longer represent the origin reservation identifier. Intervening nodes will not be able to correctly classify packets, that belong to the flow. Therefore, when flow transparency is required, a reservation identifier information element is needed to transport the origin reservation identifier information. Different suggestions of a modified specification for defining the 20-bit flow label field, such as the paper "A Modified Specification for Use of the IPv6 Flow Label for Providing Efficient Quality of Service Using Hybrid Approach" (Internet Draft, February 2002) by R. Banerjee et al., are actually out of the scope of this invention. In contrast to some of these suggestions, a static flow label is assumed during the session lifetime.

A packet classification identifier, which is described in the article "Integrated Services in the Internet Architecture: An Overview" (IETF RFC 1633, June 1994) by R. Braden et al., is used to classify packets into a flow or a sequence of packets which should be treated in a specified way. Therefore, the term "reservation identifier" is used to identify a unique flow. It is proposed that the reservation identifier is built out of the IPv6 sender source address (the address of the flow-generating host) and the IPv6 flow label defined in the "Internet Protocol, Version 6 (IPv6) Specification" (IETF RFC 2460, December 1998) by S. Deering and R. Hinden. This is not mandatory owing to the requirement that a reservation identifier should be independent of the flow identifier, the IP address of the QoS initiator, and the flow end points. Various scenarios in the mobility area require this independence because flows resulting from handoff might have changed end points etc. but still have the same QoS requirement as described by M. Brunner et al. in their article "Requirements for QoS Signaling Protocols" (Internet Draft, November 2002, draft-brunner-nsis-req-02.txt).

In case flow transparency is required, a reservation identifier information element has to be used to transport the original reservation identifier information. To enable efficient IPv6 flow classification, the "reservation identifier information element" can be build out of the IPv6 flow label field and the IPv6 source address, which are located only in the IPv6 main header fields in fixed positions. In case a "reservation identifier information element" has been specified within a QoS container, the flow information in the IPv6 header has to be ignored. Within a QoS container it has to be the first QoS information element.

While RSVP uses a receiver-oriented reservation, the proposed solution is able to trigger sender—as well as receiver-based reservation requests. For a sender-based reservation (denoted as an upstream reservation) resources are allocated for the outgoing interface at each intermediate routing node. In contrast to a receiver-based reservation, network resources are allocated at an incoming interface of a routing node. To have the possibility to distinguish in which direction the reservation setup should be enabled, both communication peers need to agree on the ordering of resource control elements for upstream and downstream direction. In order to hide this assignment from intermediate routing nodes, a communication peer could change the sequence of upstream and downstream-related resource control information with respect to the ordering of resource control information in the received IP datagram.

To support a bidirectional session with the capability to perform bidirectional media adaptation, a bidirectional QoS attribute is introduced that belongs to a unique reservation identifier. This bidirectional QoS attribute informs the routers that the reservations along the communication path should be set up for both directions. The feedback about the success of the bidirectional reservation can be derived from the monitoring result, which is indicated in the "actual value" field. The assumption that a symmetric bidirectional request has been executed can be derived from the fact that only one QoS metric information element has been generated for the bidirectional reservation. In contrast to the symmetric bidirectional request, the asymmetric bidirectional case offers two QoS information elements with identical type identifiers that are grouped in one QoS container. The first QoS information element will be interpreted as the one who describes the forward flow and the second one as the one who describes the reverse flow. Up- and downstream directions are defined from the QoS-initiating node point of view.

Each QoS container can carry several QoS information elements. The piggy-packed QoS container holds resource control information in an IP datagram. It is used to allocate resources hop-by-hop, monitor resources hop-by-hop or do both at the same time for both directions of the reservation. The concept of modular flexible QoS information elements offers the advantage to fulfill in a fine-grained manner the QoS needs of a specific application. Each QoS information element should follow the TLV (Type-Length-Value) format. "Type" specifies the object data, "length" the number in octets, whereas "value" describes the data field. QoS information elements are processed in the order they appear. As an example shown in FIG. 4 the QoS information element 400a is processed before the QoS information element 400b.

Figure 5:
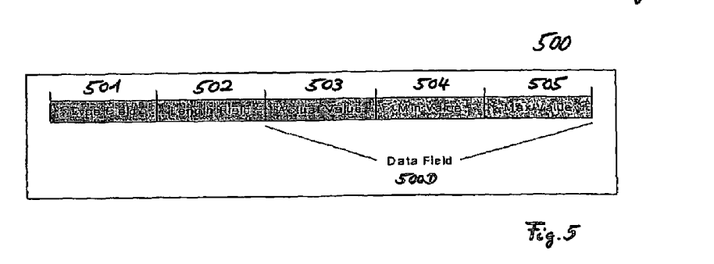
FIG. 5 illustrates an example of a modular QoS metric information element.

FIG. 5 illustrates an example of a QoS metric information element. Beside the general type and length fields there is the object's data field, which is divided in three further fields. These fields hold the actual, minimum and maximum values for a specific QoS metric. In this example the last two fields hold the values describing the QoS needs for a specific application. The third field covers the information coming from the network to give the necessary feedback about the actual situation of the end-to-end link conditions. Therefore, this field is updated with the actual value of the QoS specific network metric for each hop. If the value is set to zero, no resources are reserved for the considered metric.

Figure 6:
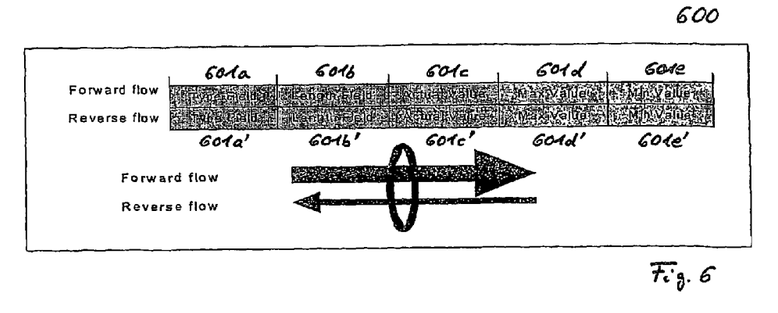
FIG. 6 illustrates an example of a modular QoS metric information element in an asymmetric bidirectional communication scenario.

FIG. 6 shows one example of a QoS metric information element in an asymmetric bidirectional scenario, which means that the up- and downstream QoS metric requests are different. Both communication peers need to agree on the ordering of resource control elements to clearly identify resource situation for upstream and downstream direction. In order to hide this agreement between communication peers from intermediate routing nodes, a communication peer could change the sequence of upstream and downstream related resource control information with respect to the ordering of resource control information in the received IP datagram.

Figure 7:
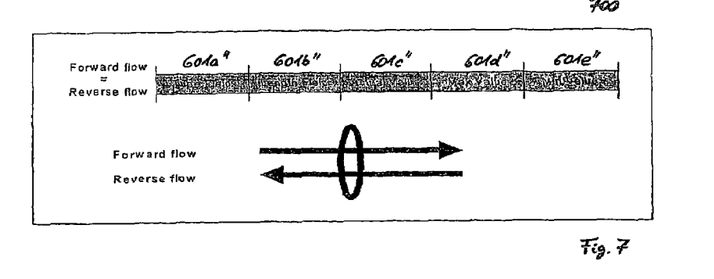
FIG. 7 illustrates an example of a modular QoS metric information element in a symmetric bidirectional communication scenario.

FIG. 7 illustrates one example of a QoS metric information element in a symmetric bidirectional scenario. Within a symmetric bidirectional reservation request up- and downstream QoS metrics are equal. In this case, only one QoS information element with the same type identifier is stored in the QoS container.

Figure 8:
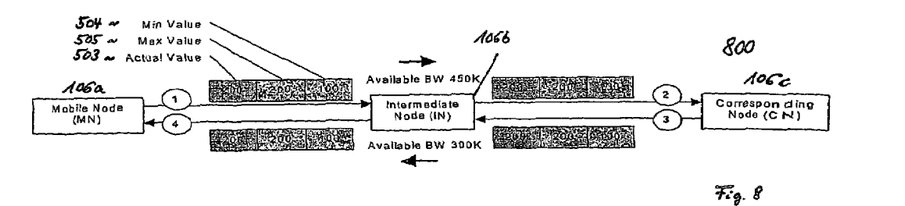
FIG. 8 shows a communication example in a symmetric bidirectional communication scenario with sufficient resources.

FIG. 8 shows a communication example in a symmetric bidirectional scenario with sufficient resources. The mobile node 106a (MN) sends a symmetric bidirectional reservation request (1) via the intermediate node 106b (IN) (2) to the correspondent node 106c (CN). Thereby, the IN has sufficient resources to fulfill the bidirectional resource request that has been initiated by the MN. Therefore, the IN reserves 200 Kbit/s in each direction and forwards (2) the bidirectional reservation request to the CN. The CN has now the information that the reservation request has been succeeded. It replies (3), explicit or piggybacked, the result to the MN. In downstream direction the intermediate node 106b may interpret the reservation request again (4).

Figure 9:
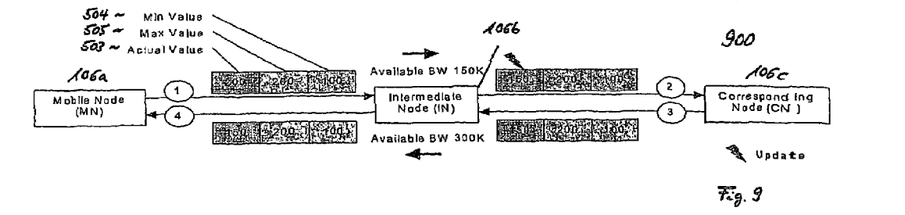
FIG. 9 shows a communication example in a symmetric bidirectional communication scenario with insufficient resources.

FIG. 9 shows a communication example in a symmetric bidirectional scenario with insufficient resources. The mobile node 106a (MN) sends a symmetric bidirectional reservation request (1) via the intermediate node 106b (IN) (2) to the correspondent node 106c (CN). Thereby, the IN has insufficient resources to fulfill the bidirectional resource request initiated from MN. The IN is only capable to reserve a bitrate of 150 Kbit/s for the upstream direction. The actual value field is therefore changed from 200 Kbit/s to 150 Kbit/s. Node IN forwards (2) the updated bidirectional reservation request to the CN. The CN has now the information that the reservation request could not be fulfilled. It replies (3, 4), explicit or piggybacked, the result to the MN. It is now up to the associated application running on the MN to react accordingly to the insufficient resource availability along the path.

TABLE 1

Definitions

| Technical Term | Brief Explanation of the Technical Term |
| --- | --- |
| Ad-hoc Computing | Ad-hoc computing refers to an automatic discovery of general-purpose services advertised in a network. The discovery process can be based on predefined information about the respective service name and/or type. |
| Ad-hoc Networking | By contrast, ad-hoc networking means the discovery of automatic devices and the establishment of connectivity among nearby devices in an unplanned, unmanaged fashion. Therefore, a routing of messages can be accomplished on the basis of a multi-hop technique, in which routing functionality is offered by most (if not even all) the nodes participating to the ad-hoc network. |
| Ad-hoc Networks | An ad-hoc network can be any network for mobile communication devices established by using the ad-hoc networking mechanism as described above. For example, it can be an unmanaged, unplanned network of fixed and/or moving intercommunicating computing devices. |
| Assisted Ad-hoc Networks | An assisted ad-hoc network can be any network of communication devices established by using the ad-hoc networking mechanism as described above, but under the assistance and control of a so-called network operator providing AAA functionality as well as value-added services. |
| Downstream and Upstream | The directional terms "upstream" and "downstream" are defined with respect to the direction of a data flow. The traffic direction from a source terminal towards a destination terminal is referred to as "downstream"; the traffic direction from the destination terminal towards the source terminal is referred to as "upstream". |
| QoS Initiator | This entity is responsible for initiating application-flow-based reservations along a network path by signaling a resource request to the network. The entity can be located in the end system but may also reside elsewhere in the network. In addition, QoS provisioning mechanisms local to the entity might be executed if there is a limitation in available resources. |
| Reservation Aggregation | Reservation aggregation occurs if multiple reservations emerging from different source terminals towards the same destination terminal can be merged to represent a single reservation. The merging node has to agree on combining reservations based on configured networking policy or management decisions. |
| Reservation Sender and Receiver | A reservation sender is an upstream border router that originates reservation messages. A reservation receiver is defined as a downstream border router that terminates reservation messages. |
| Spontaneous Ad-hoc Networks | These are traditional ad-hoc networks, wherein no assistance from any network operator is provided whatever happens. Eventually, assisted ad-hoc networks can not keep up with spontaneous ad-hoc networks, whenever the involved peers get out of coverage of any access networks. |

TABLE 2

Depicted Features and their Corresponding Reference Signs

| No. | Technical Feature (System Component, Method Step) |
| --- | --- |
| 100 | diagram showing an overview of a wireless bidirectional communication scenario, wherein different paths are reserved for the up-and downlink connection, which gives an example where an application flow, generated in a mobile node 106a, can be routed between two alternative ways to get connected to an IP transport network 102 |

TABLE 2-continued

Depicted Features and their Corresponding Reference Signs

| No. | Technical Feature (System Component, Method Step) |
|---|---|
| 102 | wired core (IP transport) network, based on IPv6 |
| 103 | gateway between the wired core network 102 and a wireless network 104 |
| 104 | dynamic mobile ad-hoc network comprising a number of interconnected intermediate nodes 105a – c, wherein the connectivity of these nodes is unpredictably time-varying |
| 105a-c | wireless routers (forwarding nodes), interconnected via the mobile ad-hoc network 104 |
| 106a | mobile node, connected to a correspondent node 106c via at least one intermediate node 106b |
| 106b | (in FIG. 8) intermediate node, connected to the wired core network 102 and/or the wireless network 104 |
| 106c | (in FIG. 8) correspondent node of said mobile node 106a |
| 200 | diagram showing an overview of a wireless bidirectional communication scenario, wherein the same paths are reserved for the up-and downlink connection |
| 300 | flow chart showing the bidirectional reservation setup procedure according to one embodiment of the present invention |
| 400 | diagram showing an example for the structure of the QoS container of an IP datagram |
| 400a | first resource (QoS) information element, stored in the QoS container |
| 400b | second resource (QoS) information element, stored in the QoS container |
| 401a | type field (length: 1 byte) of the first QoS information element 400a which is stored in the QoS container |
| 401b | length field (length: 1 byte) of the first QoS information element 400a |
| 401c | data field (length: 2 bytes) of the first QoS information element 400a |
| 401d | data field (length: 4 bytes) of the first QoS information element 400a |
| 401a' | type field (length: 1 byte) of the second QoS information element 400b which is stored in the QoS container |
| 401b' | length field (length: 1 byte) of the second QoS information element 400b |
| 401c' | data field (length: 2 bytes) of the second QoS information element 400b |
| 401d' | data field (length: 4 bytes) of the second QoS information element 400b |
| 500 | diagram showing an example of a modular QoS metric information element |
| 500D | data field (length: 3 bytes) of the QoS metric information element 500 |
| 501 | type field (length: 1 byte) of the QoS metric information element 500 |
| 502 | length field (length: 1 byte) of the QoS metric information element 500 |
| 503 | actual-value field (length: 1 byte) of the QoS metric information element 500 |
| 504 | minimum-value field (length: 1 byte) of the QoS metric information element 500 |
| 505 | maximum-value field (length: 1 byte) of the QoS metric information element 500 |
| 600 | diagram showing an example of a modular QoS metric information element in an asymmetric bidirectional communication scenario |
| 601a | type field (length: 1 byte) of the QoS metric information element 600 in case of an asymmetric bidirectional scenario, indicating the data type of data transmitted from the mobile node 106a to its correspondent node 106c (forward flow) |
| 601b | length field (length: 1 byte) of the QoS metric information element 600 in case of an asymmetric bidirectional scenario, indicating the amount of data transmitted from the mobile node 106a to its correspondent node 106c (forward flow) |
| 601c | actual-value field (length: 1 byte) of the QoS metric information element 600 in the forward-flow case of the asymmetric bidirectional scenario, which contains a discrete value for the respective resource attribute |
| 601d | maximum-value field (length: 1 byte) of the QoS metric information element 600 in the forward-flow case of the asymmetric bidirectional scenario, which contains the upper threshold value of said interval |

TABLE 2-continued

Depicted Features and their Corresponding Reference Signs

| No. | Technical Feature (System Component, Method Step) |
|---|---|
| 601e | minimum-value field (length: 1 byte) of the QoS metric information element 600 in the forward-flow case of the asymmetric bidirectional scenario, which contains the lower threshold value of an interval within which values for the respective resource attribute are acceptable for the reservation |
| 601a' | type field (length: 1 byte) of the QoS metric information element 600 in case of an asymmetric bidirectional scenario, indicating the data type of data transmitted from the correspondent node 106c to the mobile node 106a (reverse flow) |
| 601b' | length field (length: 1 byte) of the QoS metric information element 600 in case of an asymmetric bidirectional scenario, indicating the amount of data transmitted from the correspondent node 106c to the mobile node 106a (reverse flow) |
| 601c' | actual-value field (length: 1 byte) of the QoS metric information element 600 in the reverse-flow case of the asymmetric bidirectional scenario |
| 601d' | maximum-value field (length: 1 byte) of the QoS metric information element 600 in the reverse-flow case of the asymmetric bidirectional scenario |
| 601e' | minimum-value field (length: 1 byte) of the QoS metric information element 600 in the reverse-flow case of the asymmetric bidirectional scenario |
| 601a" | type field (length: 1 byte) of the QoS metric information element 700 in case of a symmetric bidirectional scenario |
| 601b" | length field (length: 1 byte) of the QoS metric information element 700 in case of a symmetric bidirectional scenario |
| 601c" | actual-value field (length: 1 byte) of the QoS metric information element 700 in case of a symmetric bidirectional scenario |
| 601d" | maximum-value field (length: 1 byte) of the QoS metric information element 700 in case of a symmetric bidirectional scenario |
| 601e" | minimum-value field (length: 1 byte) of the QoS metric information element 700 in case of a symmetric bidirectional scenario |
| 700 | diagram showing an example of a modular QoS metric information element in a symmetric bidirectional communication scenario |
| 800 | diagram showing a communication example in a symmetric bidirectional communication scenario with sufficient resources |
| 900 | diagram showing a communication example in a symmetric bidirectional communication scenario with insufficient resources |
| S1 | step #1: embedding resource control information to be transmitted between the mobile node 106a and the correspondent node 106c in an IP datagram 400 which is sent hop-by-hop via the routing path of the reserved connection for these nodes 106a + c |
| S2 | step #2: disseminating resource control information between the mobile node 106a and the correspondent node 106c by using the same routing path (alternative #1) through the network 104 hop-by-hop in both directions |
| S3a/b | step #3a/b: initiating a resource reservation request message indicating the demand for a predefined amount of network resources simultaneously for both directions by the mobile node 106a (S3a) or its correspondent node 106c (S3b) |
| S4 | step #4: generating a unique reservation identifier (ID) associating the bidirectional connection with a single application flow or an aggregated flow for IP datagram classification in both directions by the initiator 106a/c of the resource reservation request message to achieve a specific forwarding behavior which remains unchanged during the lifetime of the associated flow |
| S5 | step #5: hop-by-hop allocating network resources by using resource control information piggy-packed in an IP datagram 400 |
| S6 | step #6: hop-by-hop monitoring these network resources |
| S7 | step #7: piggybacking resource control information for each direction of a reservation via resource information elements 400a + b which are a part of the header extension 401c + d, 401c' + d' of the IP datagram 400, wherein each resource |

TABLE 2-continued

Depicted Features and their Corresponding Reference Signs

| No. | Technical Feature (System Component, Method Step) |
|---|---|
| | information element 400a + b represents either a resource attribute along the reserved routing path (alternative #1), associated with a quantifiable resource metric for either one or both directions of the flow, or a flow attribute for an individual flow or flow aggregate, associated with quantifiable and non-quantifiable flow context information either for one or both directions of the flow |
| S8 | step #8: determining the number of resource information elements 400a + b to be placed into an IP datagram header 401c + d, 401c' + d' by the node (106a or 106c) which originates the resource control information |
| S9a | step #9a: simultaneously monitoring information about available resources for both directions of the reservation along the reserved routing path (alternative #1) between the mobile node 106a and the correspondent node 106c |
| S9b | step #9b: determining actual resource attribute values for up-and downstream direction for every node 105b + c along the reserved routing path (alternative #1) |
| S9c | step #9c: if at any node 105b + c along the reserved routing path (alternative #1) a monitored resource attribute either for up-or downstream direction or for both directions has a value which is less than the correspondent monitored attribute value that is carried in the IP datagram header, assigning the new value to the resource information element 400a/b of the IP datagram header |
| S9d | step #9d: determining current resource values for both directions by the receiver of the resource control information |
| S10a | step #10a: sending a resource reservation request message describing a set of attribute requirement specifications |
| S10b | step #10b: controlling the resource allocation procedure either for one or both directions of the resource reservation by either the mobile node 106a or the correspondent node 106c |
| S10c | step #10c: based on such a resource reservation request message, determining resource attribute values that should be allocated for the upstream direction, the downstream direction or both directions at the same time by every forwarding node 105b + c along the reserved routing path (alternative #1) |
| S11a | step #11a: piggy-packing resource control information for different bidirectional flows in the same IP datagram 400 |
| S11b | step #11b: attaching a reservation identifier information element referring to additional flow and resource information elements 400a + b in the header of the IP datagram 400 to the IP datagram header for each flow |
| S11c | step #11c: determining the membership of this information to a specific flow by the grouping of reservation identifiers and other resource information elements 400a + b |
| S12 | step #12: determining on the IP layer whether bidirectional or unidirectional resource control information can be inserted into an IP datagram 400 that is ready to be transmitted to the networking interface or whether a separate IP datagram 400 needs to be generated for that purpose by the mobile node 106a or the correspondent node 106c |
| S13a | step #13a: recognizing conditions of insufficient resources along the routing path for upstream and downstream direction at the correspondent node 106c |
| S13b | step #13b: comparing monitored attribute values with the attribute requirement specifications in the resource information elements 400a + b of an arriving IP datagram 400 |
| S14 | step #14: setting monitored resource attribute values of specific resource information elements specified in the IP datagram header 400 to zero in case at least one forwarding nodes 150b + c does not support these resource attributes |
| S15 | step #15: setting those attribute values carried in the IP datagram header to zero that enable reservation end points to easily interpret the situation of routing asymmetry if up-and downstream path for a bidirectional reservation do not follow identical routes at a specific routing node 105b/c along the reserved routing path (alternative #1) |
| S16a | step #16a: interpreting resource reservation request messages with the value zero for one or more attribute requirement specifications as explicit release messages by |

TABLE 2-continued

Depicted Features and their Corresponding Reference Signs

| No. | Technical Feature (System Component, Method Step) |
|---|---|
| | the forwarding nodes 105b + c along the reserved routing path (alternative #1) and by the initiator or receiver of the resource reservation request messages |
| S16b | step #16b: associating the values of these attribute requirement specifications with the removal of flow-specific reservation state information in the forwarding nodes 105b + c along the reserved routing path (alternative #1) |
| S17a | step #17a: interpreting resource reservation request messages with a value unequal to zero for one or more attribute requirement specifications as explicit setup messages by the forwarding nodes 105b + c along the reserved routing path (alternative #1) and by the receiver 106c of the resource reservation request messages |
| S17b | step #17b: associating the values of these attribute requirement specifications with the installation of flow-specific reservation state information in the forwarding nodes 105b + c along the reserved routing path (alternative #1) |
| S18a | step #18a: piggy-packing a flow information element specifying the type of reservation as either bidirectional or unidirectional in the IP datagram header 401c + d, 401c' + d' of a reservation setup message |
| S18b | step #18b: interpreting this flow information element at the forwarding nodes 105b + c along the reserved routing path (alternative #1) to ensure correct installation of reservation state information |
| S301 | step #301: starting the resource probing mechanism |
| S302 | step #302: in case query #301 yields "FALSE" or query #302 yields "TRUE", setting the "actual value" field for the backward direction within the QoS metric information element to zero and updating the "actual value" field |
| S303 | step #303: processing the module "passive or active reservation" for the uplink network path |
| S304 | step #304: in case query #302 yields "FALSE", updating the "actual value" fields for both directions within the QoS metric information element |
| S305 | step #305: processing the module "passive or active reservation" for the uplink and downlink network paths |
| Q301 | query #301: query whether the routing node supports a bidirectional reservation |
| Q302 | query #302: in case query #301 yields "TRUE", query whether the uplink and downlink network paths differ |

The invention claimed is:

1. A quality-of-service reservation method for managing network resources and/or service parameters needed for symmetric real-time multimedia applications and/or data services running on a mobile node and a correspondent node by signaling resource control information along specific routing paths between the nodes, the method comprising:

embedding resource control information to be transmitted between the mobile node and the correspondent node in a message which is sent via the routing path of a reserved connection for the nodes;

disseminating resource control information between the mobile node and the correspondent node by using the same routing path through the network in both directions; and setting those attribute values carried in an IP datagram header to zero which permit reservation end points to interpret the situation of routing asymmetry if upstream and downstream paths for a bidirectional reservation do not follow identical routes at a specific routing node along the reserved routing path.

2. A method according to claim 1, wherein
the mobile node initiates a resource reservation request message indicating demand for a predefined amount of network resources simultaneously for both directions.

3. A method according to claim 1, wherein
the correspondent node initiates a resource reservation request message indicating demand for a predefined amount of network resources simultaneously for both directions.

4. A method according to claim 2, wherein
the initiator of the resource reservation request message generates a unique reservation identifier associating a bidirectional connection to achieve a specific forwarding behaviour which remains unchanged during the lifetime of an associated flow of the bidirectional connection.

5. A method according to claim 2, further comprising:
allocating network resources by using resource control information piggy-packed in an IP datagram, monitoring the network resources, or simultaneously allocating and monitoring at the same time for both directions of the resource reservation request message,
wherein resource control information for both directions of the reserved routing path is embedded in a same IP datagram.

6. A method according to claim 1, wherein
resource control information for each direction of a reservation is piggybacked via resource information elements that are a part of a header extension of an IP datagram, wherein each resource information element represents either a resource attribute along the reserved routing path, associated with a quantifiable resource metric for either one or both directions of the flow, or a flow attribute for an individual flow or flow aggregate, associated with quantifiable and non-quantifiable flow context information either for one or both directions of the flow.

7. A method according to claim 6, wherein
the resource information elements describe resource control information for upstream direction from the initiator towards the receiver or downstream direction from the receiver towards the initiator of a resource reservation request message or for both directions together, wherein upstream and downstream direction are uniquely identified by the mobile node and the correspondent node due to their role in the reservation procedure either as initiator or receiver of a resource reservation request message.

8. A method according to claim 6, wherein
the resource information elements are organized in a modular fashion for each flow, wherein the node that originates the resource control information determines the number of resource information elements to be placed into the IP datagram header.

9. A method according to claim 6, wherein
at least one of the resource information elements includes a field for the monitored attribute value and attribute requirement specification fields specifying resource-attribute-specific flow requirements, which are described by an upper threshold defining the maximum value and/or a lower threshold defining the minimum value for the respective resource attribute.

10. A method according to claim 1, further comprising:
simultaneously monitoring information about available resources for both directions of the reservation along the reserved routing path between the mobile node and the correspondent node;
for every node along the reserved routing path, determining actual resource attribute values for upstream and downstream directions; and
if at any node along the reserved routing path a monitored resource attribute either for the upstream or downstream direction or for both directions has a value which is less than the correspondent monitored attribute value that is carried in an IP datagram header, assigning the new value to the resource information element of the IP datagram header, which enables the receiver of the resource control information to determine current resource values for both directions.

11. A method according to claim 1, further comprising:
sending a resource reservation request message describing a set of attribute requirement specifications and controlling the resource allocation procedure either for one or both directions of the resource reservation by either the mobile node or the correspondent node; and
based on such a resource reservation request message, determining resource attribute values that should be allocated for the upstream direction, the downstream direction, or both directions at the same time by every forwarding node along the reserved routing path.

12. A method according to claim 1, wherein
resource control information for different bidirectional flows is piggy-packed in a same IP datagram, wherein for each flow a reservation identifier information element referring to additional flow and resource information elements in the header of the IP datagram is attached to the IP datagram header and a grouping of reservation identifiers and other resource information elements determines membership of the information to a specific flow.

13. A method according to claim 1, wherein
either the mobile node or the correspondent node determines on an IP layer whether bidirectional or unidirectional resource control information can be inserted into an IP datagram that is ready to be transmitted to the networking interface or whether a separate IP datagram needs to be generated for that purpose.

14. A method according to claim 13, wherein
resource control information is placed in any IP datagram which follows the reserved routing path between the initiator and the receiver of a resource reservation request message.

15. A method according to claim 1, further comprising:
recognizing conditions of insufficient resources along the routing path for upstream and downstream directions at the correspondent node by comparing monitored attribute values with the attribute requirement specifications in the resource information elements of an arriving IP datagram.

16. A method according to claim 1, further comprising:
setting monitored resource attribute values of specific resource information elements specified in an IP datagram header to zero in case one or more forwarding nodes do not support the resource attributes.

17. A method according to claim 1, further comprising:
interpreting resource reservation request messages with a value zero for one or more attribute requirement specifications as explicit release messages by forwarding nodes along the reserved routing path and by the initiator or receiver of the resource reservation request messages; and
associating values of the attribute requirement specifications with removal of flow-specific reservation state information in the forwarding nodes along the reserved routing path.

18. A method according to claim 1, further comprising:
interpreting resource reservation request messages with a value unequal to zero for one or more attribute requirement specifications as explicit setup messages by forwarding nodes along the reserved routing path and by the receiver of the resource reservation request messages; and
associating values of these attribute requirement specifications with installation of flow-specific reservation state information in the forwarding nodes along the reserved routing path.

19. A method according to claim 1, further comprising:
piggy-packing a flow information element specifying a type of reservation as either bidirectional or unidirectional in an IP datagram header of a reservation setup message; and
interpreting the flow information element at forwarding nodes along the reserved routing path to ensure correct installation of reservation state information.

* * * * *